(12) United States Patent
Wei et al.

(10) Patent No.: US 12,511,233 B2
(45) Date of Patent: Dec. 30, 2025

(54) FOLDING DATA USING VALID TRANSLATIONAL UNIT VALUES

(71) Applicant: Micron Technology, Inc., Boise, ID (US)

(72) Inventors: Meng Wei, Shanghai (CN); Tom V. Geukens, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 107 days.

(21) Appl. No.: 18/615,069

(22) Filed: Mar. 25, 2024

(65) Prior Publication Data
US 2024/0330177 A1    Oct. 3, 2024

Related U.S. Application Data

(60) Provisional application No. 63/455,787, filed on Mar. 30, 2023.

(51) Int. Cl.
*G06F 12/02* (2006.01)
*G06F 13/16* (2006.01)

(52) U.S. Cl.
CPC ...... *G06F 12/0292* (2013.01); *G06F 12/0246* (2013.01); *G06F 13/1626* (2013.01); *G06F 2212/7201* (2013.01)

(58) Field of Classification Search
CPC ............ G06F 12/0246; G06F 12/0292; G06F 13/1626; G06F 3/064; G06F 3/0679
USPC .................................................. 711/154, 103
See application file for complete search history.

(56) References Cited

U.S. PATENT DOCUMENTS

| | | | |
|---|---|---|---|
| 11,404,133 B1* | 8/2022 | Malshe | G11C 16/3495 |
| 2016/0163381 A1* | 6/2016 | Lee | G11C 11/5635 |
| | | | 711/209 |
| 2022/0066646 A1* | 3/2022 | Malshe | G06F 3/064 |
| 2022/0392558 A1* | 12/2022 | Malshe | G11C 16/102 |
| 2023/0333988 A1* | 10/2023 | Tian | G06F 12/0246 |

\* cited by examiner

*Primary Examiner* — Jared I Rutz
*Assistant Examiner* — Edward Waddy, Jr.
(74) *Attorney, Agent, or Firm* — Schwegman Lundberg & Woessner, P.A.

(57) ABSTRACT

Aspects of the present disclosure configure a memory sub-system controller to fold data based on valid translational unit count (VTC) values in a memory sub-system. The controller receives a request to perform a folding operation on data stored in an individual block stripe of the set of memory components. The controller retrieves, from a VTC table, a plurality of VTC values corresponding to a plurality of portions of the individual block stripe. The controller compares a first VTC value of the plurality of VTC values associated with a first of the plurality of portions to a second VTC value of the plurality of VTC values associated with a second of the plurality of portions. The controller performs the folding operation on a subset of the plurality of portions based on a result of comparing the first VTC value to the second VTC value.

20 Claims, 9 Drawing Sheets

| P2L | START TU OFFSET | END TU OFFSET | VTC VALUE |
|---|---|---|---|
| 0 | 0 | 115 | 78 |
| 1 | 120 | 235 | 79 |
| 2 | 240 | 355 | 0 |
| 3 | 360 | 475 | 84 |
| 4 | 480 | 595 | 84 |

*FIG. 4A-2*

FOLDING DATA USING VALID TRANSLATIONAL UNIT VALUES

PRIORITY APPLICATION

This application claims the benefit of priority to U.S. Provisional Application Ser. No. 63/455,787, filed Mar. 30, 2023, which is incorporated herein by reference in its entirety.

TECHNICAL FIELD

Embodiments of the disclosure relate generally to memory sub-systems and, more specifically, to providing adaptive folding operations for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 3 is a block diagram of an example block stripe including physical to logical (P2L) entries, in accordance with some implementations of the present disclosure.

FIGS. 4A-1 and 4B are block diagrams of example valid translational unit count (VTC) value table entries, in accordance with some implementations of the present disclosure, and FIG. 4A-2 is a VTC table that corresponds to a BS in FIG. 4A-1.

DETAILED DESCRIPTION

Figure 1:
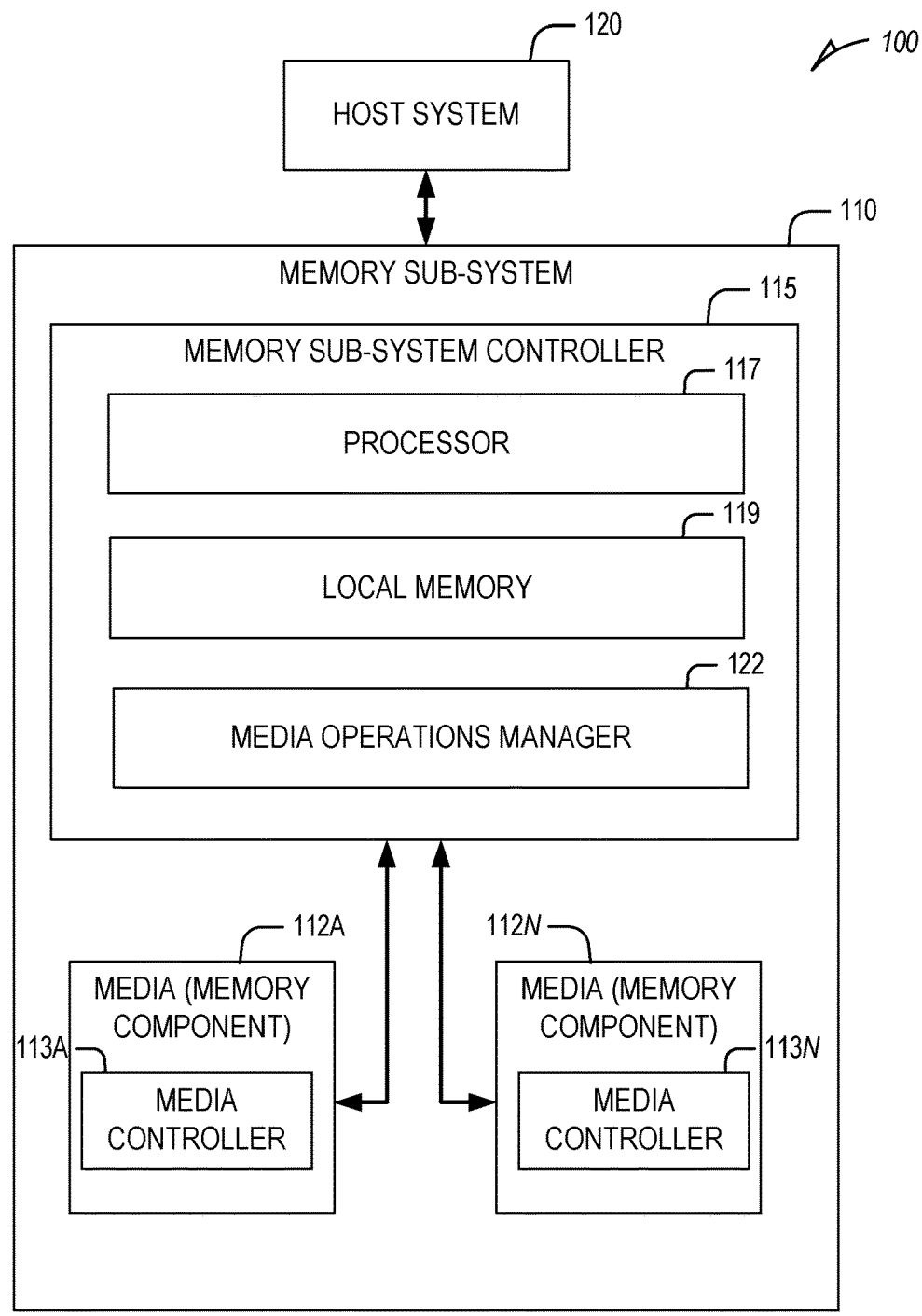
FIG. 1 is a block diagram illustrating an example computing environment including a memory sub-system, in accordance with some embodiments of the present disclosure.

Aspects of the present disclosure configure a system component, such as a memory sub-system controller, to perform VTC value-based folding operations. The memory sub-system controller can receive a request to perform a folding operation for a block stripe (also referred to as a superblock). In such cases, the memory sub-system controller accesses VTC values for different portions (e.g., different individual word lines (WLs) and/or different collections of translational units (TUs)) of the block stripe. Using the VTC values, the memory sub-system controller can selectively perform folding operations for individual portions (e.g., collections of TUs and/or individual WLs) of the block stripe. Specifically, rather than performing folding operations for the block stripe in its entirety, the memory sub-system controller can select individual portions of the block stripe to fold. In some cases, the memory sub-system controller can also use the VTC values to generate a sequence for identifying candidates of the portions of the block stripe for folding. In this way, rather than folding a block stripe in its entirety or having to analyze each TU of the block stripe to find valid and invalid entries, only those portions that store valid data can be selected for folding and analysis, which reduces the number of folding operations that need to be performed and improves the overall efficiency of operating the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations, such as a write operation, on host data that is stored on a memory device. For example, firmware of the memory sub-system may rewrite previously written host data from a location on a memory device to a new location as part of garbage collection management operations (also referred to as folding operations). The data that is re-written, for example as initiated by the firmware, is hereinafter referred to as "garbage collection data." "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, and so forth.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., negative-and (NAND) devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

There are challenges in efficiently performing garbage collection and folding operations in memory systems that leverage superblocks or block stripes (BS) to store data. Superblocks or BSs are a collection of blocks and TUs across multiple memory planes, WLs, and/or dies. Namely, each superblock can be of equal size and can include a respective collection of blocks across multiple planes and/or dies. The superblocks, when allocated, allow a controller to simultaneously write data to a large portion of memory spanning multiple blocks (across multiple planes and/or dies) with a single address. Some typical memory systems maintain a valid bitmap table for each TU that is stored in the BS. The valid bitmap table uses one bit to represent each logical translation unit (LTU) and is updated if each corresponding LTU has been re-written by the host to indicate that the data is valid or invalid. Based on which LTU is valid or invalid, the memory controller can determine whether the BS is suitable for folding. While this approach generally works, it requires a great deal of resources, such as DRAM and NAND space to maintain the bitmap table.

Another approach to controlling folding operations for BS involves a P2L page mechanism. In this approach, a set of P2L pages are stored across the BS where each P2L page stores a mapping between a subset of LTUs of the BS and their corresponding flash physical address (FPA). In order to determine whether the BS is eligible for folding, the memory controller retrieves each P2L page in sequence and compares the set of FPAs of the P2L pages to the flash physical addresses (FLAs) stored in the logical to physical address table. Based on this comparison (e.g., if the BS stores a specified threshold number of valid TUs), the memory controller can select the BS for folding in its entirety. The process of comparing each individual FPA of each individual P2L page takes a great deal of time and resources and is incredibly inefficient and time consuming. Also, in some cases, comparisons for a P2L page are performed unnecessarily, such as if the corresponding portion of the BS contains no valid TUs or very few TUs. Because of this, the conventional approach is incapable of folding only portions of the BS without folding the BS in its entirety, which makes the memory systems operate inefficiently.

Aspects of the present disclosure address the above and other deficiencies by providing a memory controller that can perform folding operations for certain portions of a BS, such that less than all of the BS is folded at a given time in response to a request to perform folding operations. To do so, the memory controller can maintain a VTC table that stores information indicating the quantity of valid TUs in each specified portion of the BS. The specified portion can correspond to the same TUs referenced by a corresponding P2L page of the portion of the BS. Based on the quantity of valid TUs, the memory controller can select or arrange the sequence in which the P2L pages are retrieved/accessed to determine which TUs of the portion of the BS are valid or invalid. Then, the memory controller can fold only those portions of the BS without folding other portions of the BS. Namely, the memory controller can fold one or more WLs and/or one or more TUs or a set of pages corresponding to the P2L page rather than all of the WLs and all of the TUs of the BS entirely. This allows the memory controller to skip over performing analysis of the P2L page for portions of the BS that contain less than a threshold number of valid TUs. In this way, the overall efficiency at which folding operations are performed is significantly improved and the number of operations needed to perform to complete folding operations is reduced.

For example, the memory controller receives a request to perform a folding operation on data stored in an individual block stripe of the set of memory components. The memory controller retrieves, from a VTC table, a plurality of VTC values corresponding to a plurality of portions of the individual block stripe. The memory controller compares a first VTC value of the plurality of VTC values associated with a first of the plurality of portions to a second VTC value of the plurality of VTC values associated with a second of the plurality of portions. The memory controller performs the folding operation on a subset of the plurality of portions based on a result of comparing the first VTC value to the second VTC value.

In some examples, the memory controller generates a sequence for identifying invalid TUs of the plurality of portions based on the plurality of VTC values. In some examples, the memory controller determines that the first VTC value fails to transgress a threshold value. The memory controller skips performing the folding operation for the first portion of the individual block stripe associated with the first VTC value in response to determining that the first VTC value fails to transgress a threshold value.

In some examples, the memory controller arranges the plurality of VTC values in descending order from a largest VTC value to a smallest VTC value. The plurality of portions can be arranged in the sequence according to the arranged descending order of the plurality of VTC values. In some examples, the memory controller arranges the plurality of VTC values in ascending order from a smallest VTC value to a largest VTC value. The plurality of portions can be arranged in the sequence according to the arranged ascending order of the plurality of VTC values.

In some examples, the first portion includes a single first WL of the individual block stripe and the second portion includes a single second WL of the individual block stripe. In some examples, the first portion includes a first set of TUs of the individual block stripe and the second portion includes a second set of TUs of the individual block stripe. The first set of TUs can span across a plurality of dies and planes and a first set of WLs of the set of memory components. The second set of TUs can span across the plurality of dies and planes and a second set of WLs of the set of memory components.

In some examples, the first and second portions are of equal size. In some examples, the memory controller performs the folding operation by retrieving a P2L entry associated with the subset of the plurality of portions. The memory controller extracts one or more intrinsic physical addresses for a corresponding set of TUs associated with the P2L entry and searches a logical to physical (L2P) table to obtain one or more current physical addresses corresponding to logical addresses of the set of TUs. The memory controller determines whether the one or more intrinsic physical addresses match the one or more current physical addresses. In some examples, the P2L entry is stored in a page of the subset of the plurality of portions. In some examples, in response to determining that the one or more intrinsic physical addresses match the one or more current physical addresses, the memory controller rewrites data stored in the set of TUs to a new portion of the set of memory components and erases an old portion of the set of memory components in which the data was stored. In some examples, the new portion corresponds to a new set of physical addresses and the old portion corresponds to the one or more current physical addresses.

In some examples, the first VTC value represents a quantity of valid TUs in the first portion of the individual block stripe. In some examples, the VTC table is stored external to the individual block stripe. In some examples, the memory controller generates the VTC table by associating a portion of the VTC table with the individual block stripe. The memory controller stores a list of P2L entry identifiers in the portion of the VTC table. The memory controller associates a first range of TU offsets with a first P2L entry and a second range of TU offsets with a second P2L entry. The memory controller maintains a corresponding VTC value for each P2L entry identifier in the list of P2L entry identifiers including the first and second P2L entries. In some examples, the first range of TU offsets is computed based on a die number, a plane number, a block number, and a page number of an individual portion of the individual block stripe corresponding to the first P2L entry. In some examples, the memory controller performs the folding operation by folding an individual word line of the individual block stripe without folding other word lines of the individual block stripe. In some examples, the memory controller distributes a plurality of P2L entries across multiple pages of the individual block stripe. A first of the P2L entries can be separated from a second of the P2L entries by a quantity of TUs represented by the second P2L entry.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed.

In some examples, a memory or register can be associated with all of the memory components 112A to 112N that can store a table that maps pages across all of the memory components 112A to 112N associated with an individual BS. Specifically, a block or set of pages within the first memory component 112A can be grouped with a block or set of pages within the second memory component 112N to form a superblock or BS. BSs can be addressed collectively using a single address. In such cases, an LTP table can store the association between the single address and each of the blocks or sets of pages of the first memory component 112A and second memory component 112N associated with that single address.

In some embodiments, the memory sub-system 110 is a storage system. A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-systems 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, and so forth.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a USB interface, a Fibre Channel interface, a Serial Attached SCSI (SAS) interface, and so forth. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a NAND-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), DRAM, synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe and a single second row that spans a second set of the pages or blocks of the memory components 112A to 112N can correspond to or be grouped as a second block stripe.

A memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, different near miss ECC operations, and/or different dynamic data refresh.

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include ROM for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112A to 112N. The configuration data can describe the lifetime PEC values and/or reliability grades associated with different groups of the memory components 112A to 112N and/or different blocks within each of the memory components 112A to 112N.

The memory sub-system controller 115 can be responsible for other memory management operations, such as wear leveling operations, garbage collection operations, folding operations, error detection and ECC operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to receive a request to perform a folding operation on data stored in an individual BS of the memory components 112A to 112N. The media operations manager 122 retrieves, from a VTC table, a plurality of VTC values corresponding to a plurality of portions of the individual block stripe. The plurality of portions can include individual pages, individual WLs, a set of pages, and/or a set of TUs of the BS. The media operations manager 122 compares a first VTC value of the plurality of VTC values associated with a first of the plurality of portions to a second VTC value of the plurality of VTC values associated with a second of the plurality of portions. The media operations manager 122 performs the folding operation on a subset of the plurality of portions based on a result of comparing the first VTC value to the second VTC value. This improves the overall efficiency of operating the memory sub-system 110.

Depending on the embodiment, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
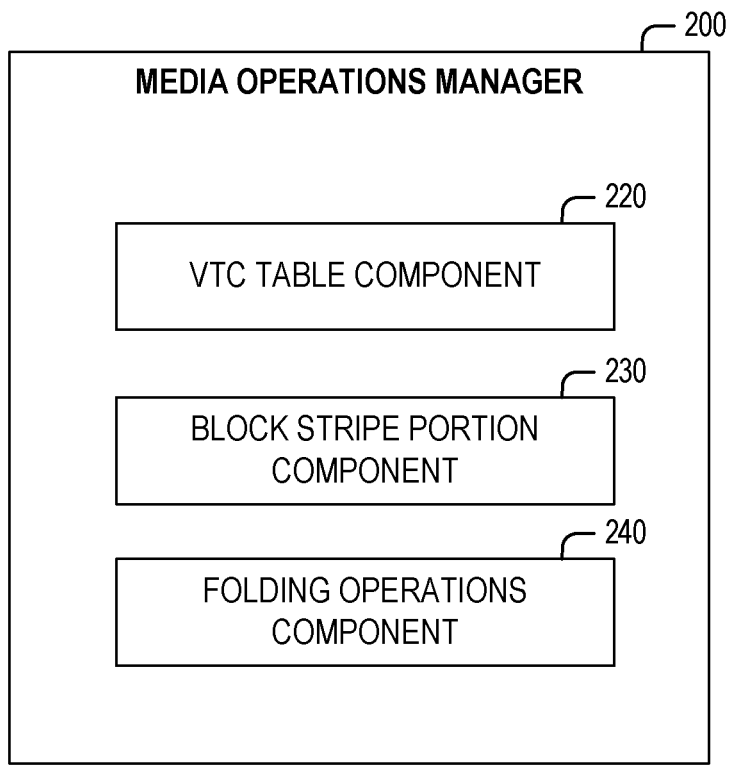
FIG. 2 is a block diagram of an example media operations manager, in accordance with some implementations of the present disclosure.

FIG. 2 is a block diagram of an example media operations manager 200 (corresponding to media operations manager 122), in accordance with some implementations of the present disclosure. As illustrated, the media operations manager 200 includes a VTC table component 220, a BS portion component 230, and a folding operations component 240. For some embodiments, the media operations manager 200 can differ in components or arrangement (e.g., less or more components) from what is illustrated in FIG. 2.

The media operations manager 200 can store data in the memory components 112A to 112N using BS. The media operations manager 200 can sequentially store portions of the data to individual TUs or pages in the BS. Once a threshold quantity of TUs or pages and/or WLs are stored in a first portion of the BS, the media operations manager 200 generates and stores a P2L page in the BS. The P2L page identifies each of the TUs stored in the first portion of the BS and the corresponding FLA of the TUs of the first portion. Subsequently, additional data can be received by the media operations manager 200 and stored to a second portion of the BS. Once the threshold quantity of TUs or pages and/or WLs are stored in second portion of the BS, the media operations manager 200 generates and stores another P2L page in the BS. In this way, each P2L page identifies a corresponding set of TUs of respective portions of the BS and the associated FLAs of each TU.

In some examples, the media operations manager 200 includes the VTC table component 220 which can maintain a VTC value for each P2L page. Namely, as data is written to the portions of a first BS, the VTC table can be updated to indicate that the data is valid. When data is written to a second BS and to a same FLA as that which is mapped to one of the TUs of the first BS, the P2L page entry of a specified portion of the first BS represented in the VTC table is updated to reduce the quantity of valid TUs. In this way, the VTC table provides a real-time view of how many TUs are valid in each specified portion of each BS. Namely, the VTC table can identify a first P2L page of the first BS and the quantity of valid TUs stored in a first portion (e.g., a first set of pages, a first single WL, a first set of multiple WLs, and/or a first set of TUs). The VTC table can be updated to identify a second P2L page of the first BS and the quantity of valid TUs stored in a second portion (e.g., a second set of pages, a second single WL, a second set of multiple WLs, and/or a second set of TUs).

The media operations manager 200 can receive a request or can itself generate a request to perform folding operations on the first BS. In some cases, the request can request that only a portion of the BS be folded rather than the entire BS. In response to receiving the request to perform folding operations, the BS portion component 230 communicates with the VTC table component 220 to identify and/or arrange the set of P2L entries of the BS in a certain sequence for processing. In some examples, the BS portion component 230 provides an identifier of the BS to the VTC table component 220. The VTC table component 220 returns to the BS portion component 230 the corresponding VTC values for each P2L entry of the identified BS. For example, the VTC values can indicate a first VTC value for a first P2L entry corresponding to a first portion of the BS (e.g., a first single WL and/or a first set of pages or TUs). The VTC values can indicate a second VTC value for a second P2L entry corresponding to a second portion of the BS (e.g., a second single WL and/or a second set of pages or TUs). The VTC values can indicate a third VTC value for a third P2L entry corresponding to a third portion of the BS (e.g., a third single WL and/or a third set of pages or TUs).

The BS portion component 230 can compare each of the VTC values of each of the identified P2L entries to identify an individual P2L entry to start the folding operations. Namely, rather than starting from the first P2L entry that is stored in the BS and that corresponds to the first portion of the BS, the BS portion component 230 can select to start folding operations with the second P2L entry that corresponds to the second portion of the BS. The second portion of the BS can correspond to a set of data that is stored between two other portions (e.g., pages, WLs, and/or TUs) of the BS. In some examples, the second P2L entry that is selected to start the folding operations can correspond to the VTC value that is greatest among all of the other VTC values received from the VTC table component 220. In some examples, the second P2L entry that is selected to start the folding operations can correspond to the VTC value that is smallest among all of the other VTC values received from the VTC table component 220.

In some cases, the BS portion component 230 can compare each of the VTC values received from the VTC table component 220 to a threshold value (e.g., 0). If a given one of the VTC values of a particular P2L entry fails to transgress the threshold value, this indicates to the BS portion component 230 that an insufficient quantity of valid TUs is presently stored in the corresponding portion of the BS. In such cases, the corresponding portion of the BS is skipped or omitted from processing for folding operations. Namely, re-writing data stored in a portion of a BS that includes less than the threshold quantity of valid TUs can be wasteful and can cause unnecessary operations and space to be consumed by the memory sub-system 110. By skipping such portions in performing the folding operations, resources can be preserved and operations are made more efficient.

In some examples, the BS portion component 230 can sort or sequentially arrange or determine a sequential ordering for the VTC values received from the VTC table component 220. Namely, the BS portion component 230 can arrange the VTC values in ascending or descending order from the largest VTC value to the smallest VTC value or vice versa. Then, the BS portion component 230 can process the P2L entries according to the corresponding order of the VTC values. For example, the BS portion component 230 can determine that the third VTC value corresponding to the third P2L entry is largest in value and that the first VTC value corresponding to the first P2L entry is smallest in value among all the VTC values. In such cases, the BS portion component 230 places the third portion of the BS corresponding to the third P2L entry first in the folding operations sequence and places the first portion of the BS corresponding to the first P2L entry last in the folding operations sequence.

The BS portion component 230 provides the sequence of the P2L entries to the folding operations component 240. The folding operations component 240 then performs folding operations including identifying which TUs in the corresponding portion of the BS are valid and invalid by comparing the FLA stored in the P2L entry to the corresponding FLA stored in the L2P table for the same LTU. Namely, the folding operations component 240 can determine that the third P2L entry needs to be processed first and before the first P2L entry. In response, the folding operations component 240 retrieves the third P2L entry from the BS. The folding operations component 240 obtains the TUs and the corresponding FLA (referred to as the intrinsic FLA) stored for each TU in the third P2L entry. The folding operations component 240 provides the LTU or the logical address of the TU to the L2P table. The folding operations component 240 obtains the current FLA stored in the L2P table for the LTU or logical address. The folding operations component 240 can compare the intrinsic FLA to the current FLA stored in the L2P table. If the two FLAs match, the folding operations component 240 determines that the TU associated with the logical address in the third P2L entry is valid. The folding operations component 240 then continues to retrieve the next LTU to perform the same comparison. Once the folding operations component 240 identifies which TUs are valid and which TUs are not valid in the third portion of the BS corresponding to the third P2L entry, the folding operations component 240 can rewrite the valid TUs to a new portion of another BS and can erase the third portion of the BS in which the valid TUs are currently stored.

Figure 3:
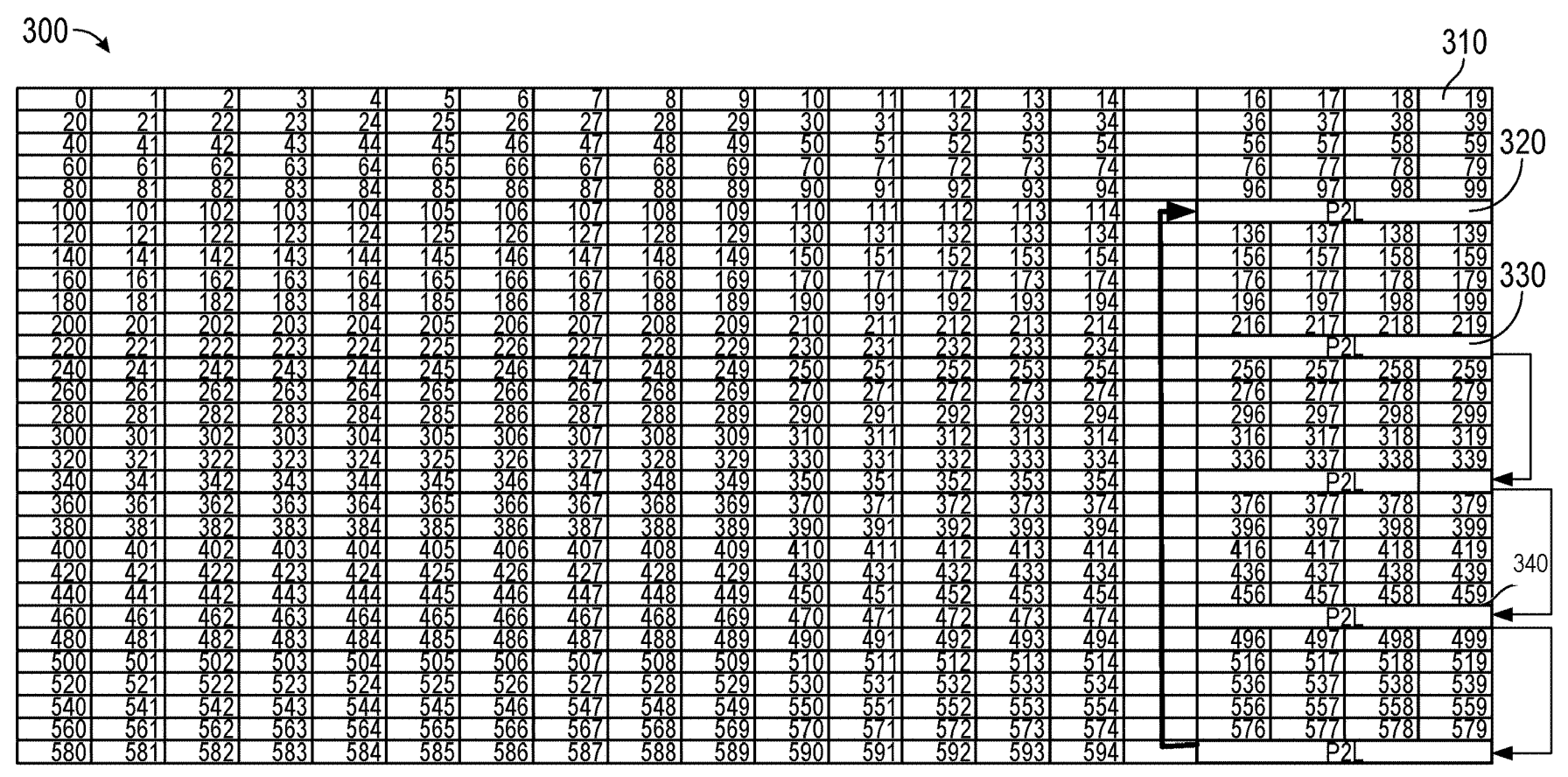

FIG. 3 is a block diagram of an example BS 300 including P2L entries, in accordance with some implementations of the present disclosure. As shown, the BS 300 includes a plurality of TUs 310. The BS 300 includes a first P2L entry 320 corresponding to a first collection of TUs 310, a second P2L entry 330 corresponding to a second collection of TUs 310, a third P2L entry 340 corresponding to a third collection of TUs 310, and so forth. The media operations manager 200 can receive a request to perform folding operations on the BS 300. In such cases, the media operations manager 200 retrieves the VTC value associated with each of the P2L entries stored in the BS 300. In some cases, the media operations manager 200 determines that the second P2L entry 330 is associated with the greatest quantity of valid TUs based on the VTC value obtained from the VTC table. In such cases, the media operations manager 200 can begin folding operations starting with the second P2L entry 330.

In some examples, the media operations manager 200 can determine that the third P2L entry 340 is associated with a VTC value that is lower than the VTC value of the second P2L entry 330 but greater than the VTC value associated with the first P2L entry 320. In such cases, the media operations manager 200 starts processing the third P2L entry 340 to identify which TUs associated with the portion corresponding to the third P2L entry 340 are valid or invalid after completing similar operations on the second P2L entry 330. The media operations manager 200 can determine that the first P2L entry 320 is associated with the lowest VTC value among all the VTC values of all the P2L entries of the BS 300. In such cases, the media operations manager 200 processes the first P2L entry 320 last after processing all the other P2L entries of the BS 300.

Figure 4A-1:
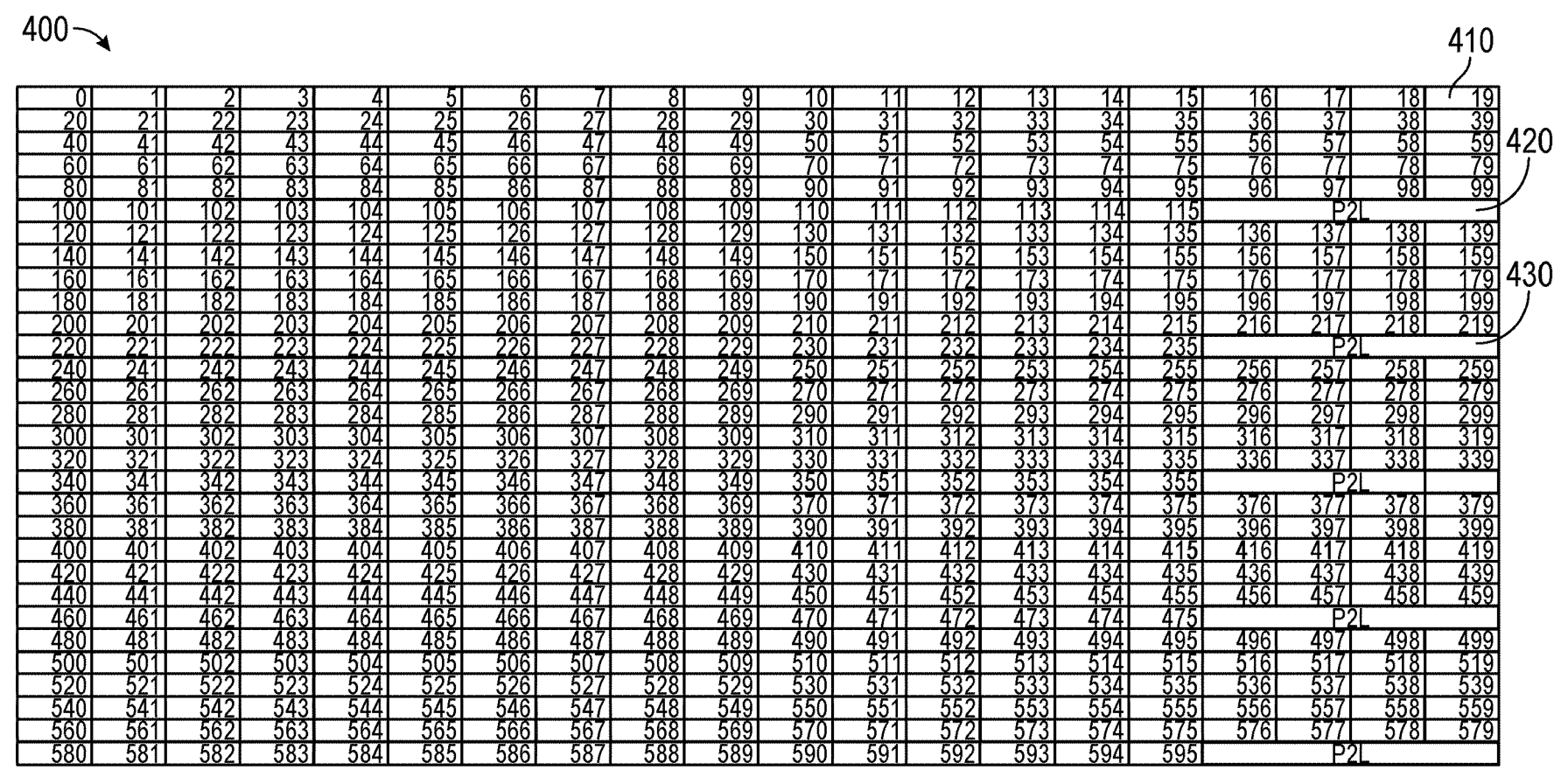
Figure 4B:
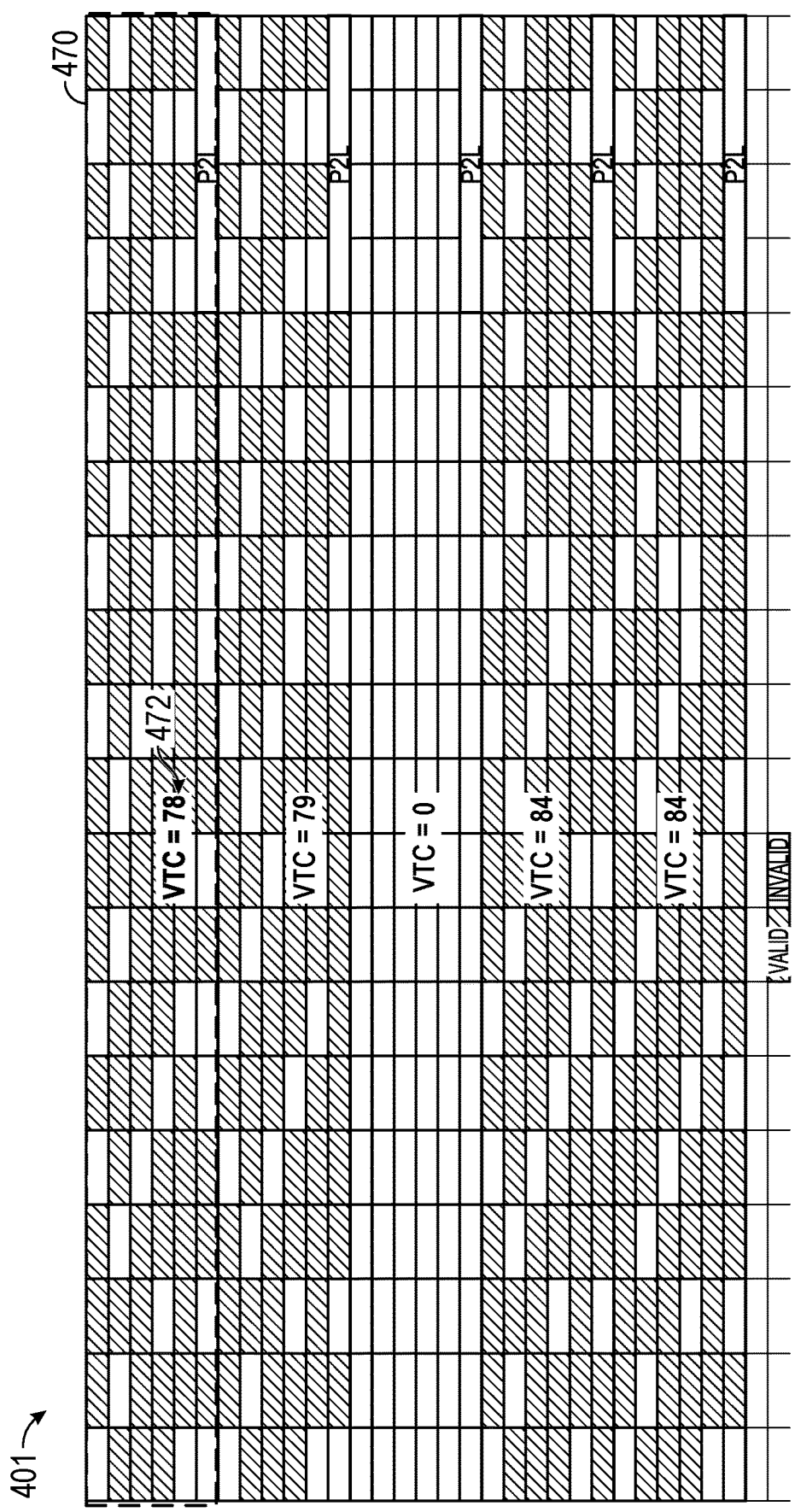

FIGS. 4A-1 and 4B are block diagrams of example VTC value table entries, in accordance with some implementations of the present disclosure, and FIG. 4A-2 is a VTC table that corresponds to a BS in FIG. 4A-1. Specifically, the media operations manager 200 can maintain a VTC table 450 that corresponds to a BS 400. The BS 400 includes a first portion 410 and a first P2L entry 420 representing the TUs of the first portion 410. The BS 400 includes a second portion subsequent to the first portion 410 and a second P2L entry 430 representing the TUs of the second portion. The media operations manager 200 can store the VTC table 450 in which a P2L identifier 452 is included and associated with a corresponding range of TUs (representing by a starting TU offset 454 and an ending TU offset 456) and a corresponding VTC value field 458. The P2L identifier 452 can be indexed by the die number, a plane number, a block number, and a page number of an individual BS 400 to allow the VTC table 450 to specifically retrieve the set of P2L identifiers for each of the P2L entries stored in a given BS.

For example, a first P2L identifier 460 can correspond to the second instance of the P2L entry of the BS 400. Namely, the first P2L identifier 460 can correspond to the second P2L entry 430. The starting TU offset 462 identifies the TU number (e.g., 120) corresponding to the first TU represented by the second P2L entry 430 and the ending TU offset 464 identifies the TU number (e.g., 235) corresponding to the last TU represented by the second P2L entry 430. The last TU can be the last TU that has been stored in the BS 400 that caused the second P2L entry 430 to be generated and a new P2L entry to begin being created for a subsequent portion of the BS 400. The VTC table 450 can provide the VTC value 466 corresponding to the second P2L entry 430, which can be used to control the order in which the P2L entries are processed to identify which TUs are valid and which are invalid in performing the folding operations, such as those discussed below in connection with FIG. 6.

For example, as shown in FIG. 4B, after processing all the VTC values from the corresponding VTC value field 458 corresponding to the BS 400, the media operations manager 200 can determine that a first portion 470 of the BS 400 is associated with a first VTC value 472 (e.g., 78), a second portion of the BS 400 is associated with a second VTC value (e.g., 79), a third portion of the BS 400 is associated with a third VTC value (e.g., 0), and fourth and fifth portions of the BS 400 are associated respectively with fourth and fifth VTC values (e.g., 84). The hashed blocks shown in FIG. 4B represent TUs in which data is valid and/or written and the blocks without hashing represent TUs that are empty, invalid, and/or in an erased state. Based on this information, the media operations manager 200 can skip over performing folding operations for the third portion (e.g., because that third portion includes no valid TUs). Also, the media operations manager 200 can begin the folding operations starting with either of the P2L entries of the fourth and fifth portions of the BS 400 because they have VTC values that are greater than the VTC values of the first and second portions of the BS 400.

In some cases, rather than or in addition to associating P2L entry identifiers with VTC values, different individual WLs of the BS 400 can be associated with corresponding VTC values. Namely, one WL (or a first collection of WLs) of the BS 400 can be associated with a first VTC value and a second WL (or a second collection of WLs) of the same BS 400 can be associated with a second VTC value. The decision on which P2L entries to process to fold individual TUs and/or WLs can be performed in a similar manner on the basis of the VTC values of the WLs rather than the VTC values of the TUs corresponding to different P2L entries.

Figure 5:
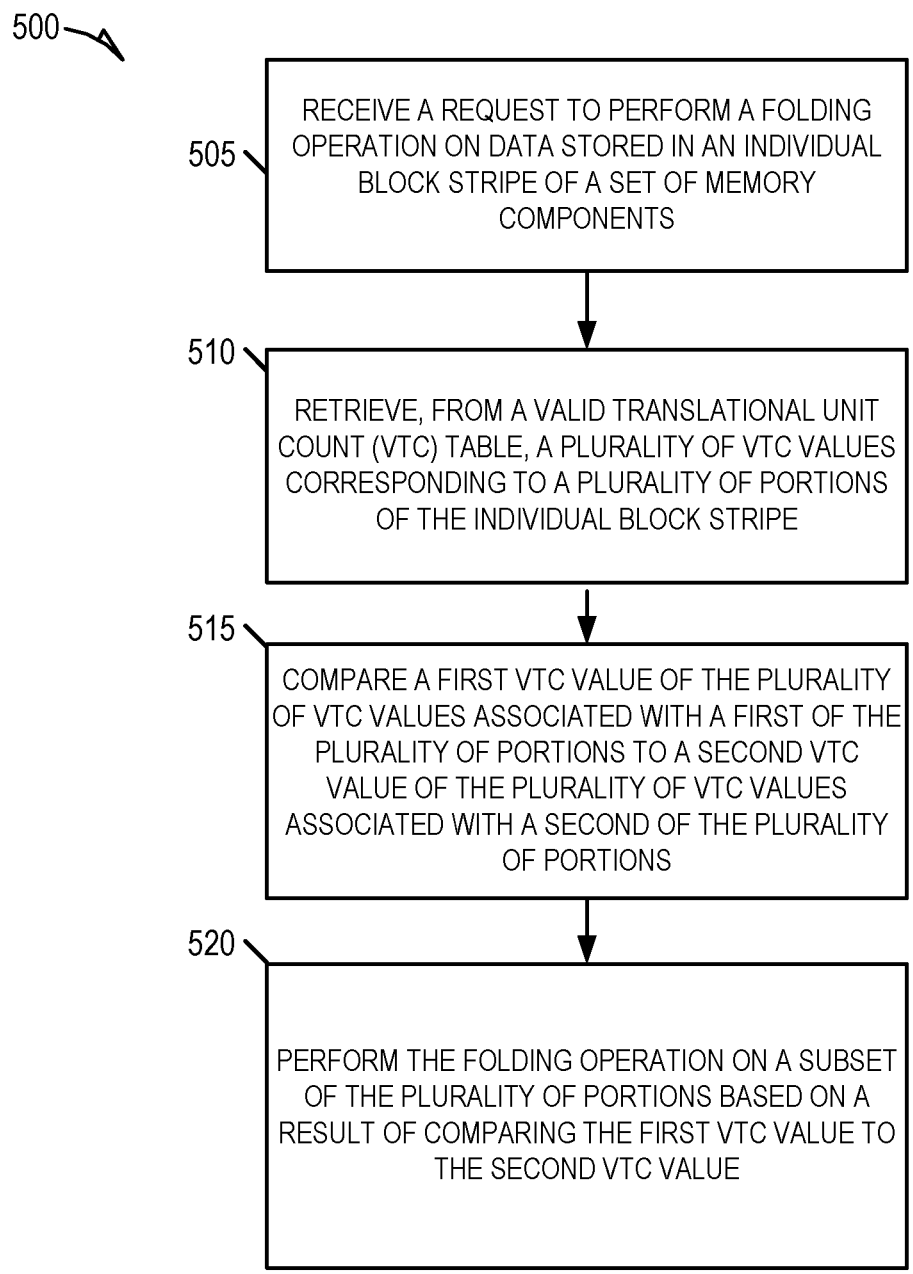
FIGS. 5 and 6 are flow diagrams of an example methods to perform VTC based folding operations, in accordance with some implementations of the present disclosure.

FIG. 5 is a flow diagram of an example method 500 of folding operations, in accordance with some implementations of the present disclosure. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 500 is performed by the media operations manager 122 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now FIG. 5, the method (or process) 500 begins at operation 505, with a media operations manager 122 of a memory sub-system (e.g., memory sub-system 110) receiving a request to perform a folding operation on data stored in an individual block stripe of the set of memory components. Then, at operation 510, the media operations manager 122 of the memory sub-system retrieves, from a VTC table, a plurality of VTC values corresponding to a plurality of portions of the individual block stripe. Thereafter, at operation 515, the media operations manager 122 compares a first VTC value of the plurality of VTC values associated with a first of the plurality of portions to a second VTC value of the plurality of VTC values associated with a second of the plurality of portions. The media operations manager 122, at operation 520, performs the folding operation on a subset of the plurality of portions based on a result of comparing the first VTC value to the second VTC value.

Figure 6:
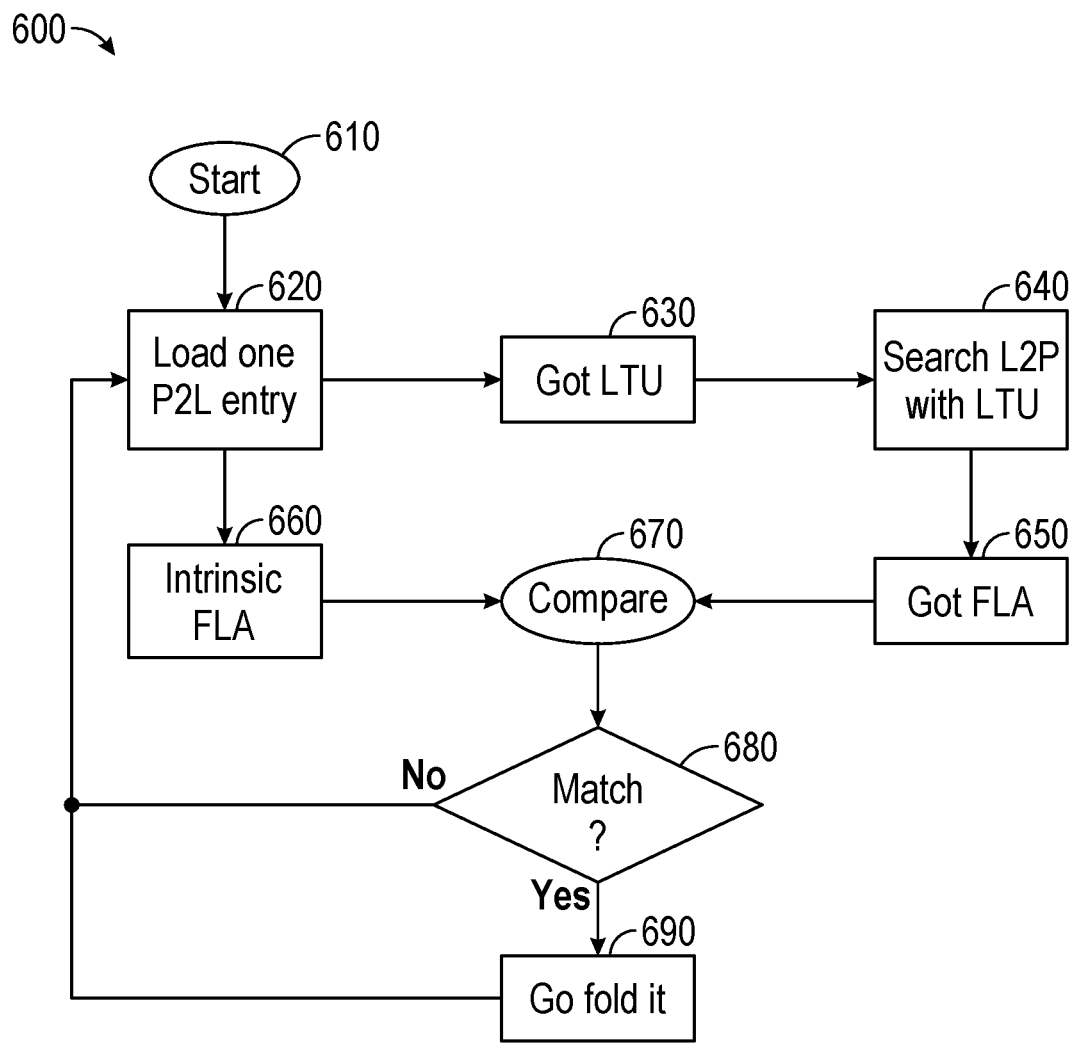

FIG. 6 is a flow diagram of an example method 600 of folding operations, in accordance with some implementations of the present disclosure. The method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 600 is performed by the media operations manager 122 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now FIG. 6, the method (or process) 600 begins at operation 610 with the media operations manager 122 receiving a request to perform folding operations for a particular P2L entry. The P2L entry can be any P2L entry of BS that has been selected based on the VTC value associated with the P2L entry (e.g., the P2L entry with a greatest VTC value among the VTC values of all other P2L entries of the same BS). Then, at operation 620, the media operations manager 122 loads the P2L entry by retrieving the LTUs and corresponding intrinsic FLAs of the TUs associated with the P2L entry. Then, at operation 660, the media operations manager 122 selects a given FLA associated with a given TU (e.g., a first FLA associated with a first TU). The media operations manager 122 also performs operation 630 to retrieve the LTU of the given TU. The media operations manager 122 searches the L2P table at operation 640 based on the LTU to retrieve the current FLA associated with the LTU at operation 650. The media operations manager 122 then performs operation 670 to compare the intrinsic FLA with the current FLA associated with the LTU. The media operations manager 122, at operation 680, determines if the intrinsic FLA matches (is the same as) the current FLA. If not, the media operations manager 122 determines that the TU stores invalid data and performs operation 620. If the intrinsic FLA matches the current FLA, the media operations manager 122 marks the TU as storing valid data and eventually, at operation 690, the media operations manager 122 folds the data stored in the TU to a new TU and erases the current TU.

In view of the disclosure above, various examples are set forth below. It should be noted that one or more features of an example, taken in isolation or combination, should be considered within the disclosure of this application.

Example 1: A system comprising: a set of memory components of a memory sub-system; and a processing device operatively coupled to the set of memory components, the processing device being configured to perform operations comprising: receiving a request to perform a folding operation on data stored in an individual block stripe of the set of memory components; retrieving, from a VTC table, a plurality of VTC values corresponding to a plurality of portions of the individual block stripe; comparing a first VTC value of the plurality of VTC values associated with a first of the plurality of portions to a second VTC value of the plurality of VTC values associated with a second of the plurality of portions; and performing the folding operation on a subset of the plurality of portions based on a result of comparing the first VTC value to the second VTC value.

Example 2. The system of Example 1, the operations comprising: generating a sequence for identifying invalid TUs of the plurality of portions based on the plurality of VTC values.

Example 3. The system of Example 2, the operations comprising: determining that the first VTC value fails to transgress a threshold value; and skipping performing the folding operation for the first portion of the individual block stripe associated with the first VTC value in response to determining that the first VTC value fails to transgress a threshold value.

Example 4. The system of any one of Examples 2-3, the operations comprising: arranging the plurality of VTC values in descending order from a largest VTC value to a smallest VTC value, wherein the plurality of portions are arranged in the sequence according to the arranged descending order of the plurality of VTC values.

Example 5. The system of any one of Examples 2-4, the operations comprising: arranging the plurality of VTC values in ascending order from a smallest VTC value to a largest VTC value, wherein the plurality of portions are arranged in the sequence according to the arranged ascending order of the plurality of VTC values.

Example 6. The system of any one of Examples 1-5, wherein the first portion comprises a single first WL of the individual block stripe, and wherein the second portion comprises a single second WL of the individual block stripe.

Example 7. The system of any one of Examples 1-6, wherein the first portion comprises a first set of TUs of the individual block stripe, and wherein the second portion comprises a second set of TUs of the individual block stripe, the first set of TUs spanning across a plurality of dies and planes and a first set of WLs of the set of memory components, the second set of TUs spanning across the plurality of dies and planes and a second set of WLs of the set of memory components.

Example 8. The system of Example 7, wherein the first and second portions are of equal size.

Example 9. The system of any one of Examples 1-8, wherein performing the folding operation comprises: retrieving a P2L entry associated with the subset of the plurality of portions; extracting one or more intrinsic physical addresses for a corresponding set of TUs associated with the P2L entry; searching a L2P table to obtain one or more current physical addresses corresponding to logical addresses of the set of TUs; and determining whether the one or more intrinsic physical addresses match the one or more current physical addresses.

Example 10. The system of Example 9, wherein the P2L entry is stored in a page of the subset of the plurality of portions.

Example 11. The system of any one of Examples 9-10, the operations comprising: in response to determining that the one or more intrinsic physical addresses match the one or more current physical addresses: rewriting data stored in the set of TUs to a new portion of the set of memory components; and erasing an old portion of the set of memory components in which the data was stored.

Example 12. The system of Example 11, wherein the new portion corresponds to a new set of physical addresses, and wherein the old portion corresponds to the one or more current physical addresses.

Example 13. The system of any one of Examples 1-12, wherein the first VTC value represents a quantity of TUs in the first portion of the individual block stripe.

Example 14. The system of any one of Examples 1-13, wherein the VTC table is stored external to the individual block stripe.

Example 15. The system of any one of Examples 1-14, the operations comprising generating the VTC table by: associating a portion of the VTC table with the individual block stripe; storing a list of P2L entry identifiers in the portion of the VTC table; associating a first range of translational unit offsets with a first P2L entry and a second range of translational unit offsets with a second P2L entry; and maintaining a corresponding VTC value for each P2L entry identifier in the list of P2L entry identifiers including the first and second P2L entries.

Example 16. The system of Example 15, wherein the first range of translational unit offsets is computed based on a die number, a plane number, a block number, and a page number of an individual portion of the individual block stripe corresponding to the first P2L entry.

Example 17. The system of any one of Examples 1-16, wherein performing the folding operation comprises folding an individual word line of the individual block stripe without folding other word lines of the individual block stripe.

Example 18. The system of any one of Examples 1-17, the operations comprising distributing a plurality of P2L entries across multiple pages of the individual block stripe, a first of the P2L entries being separated from a second of the P2L entries by a quantity of TUs represented by the second P2L entry.

Methods and computer-readable storage medium with instructions for performing any one of the above Examples.

Figure 7:
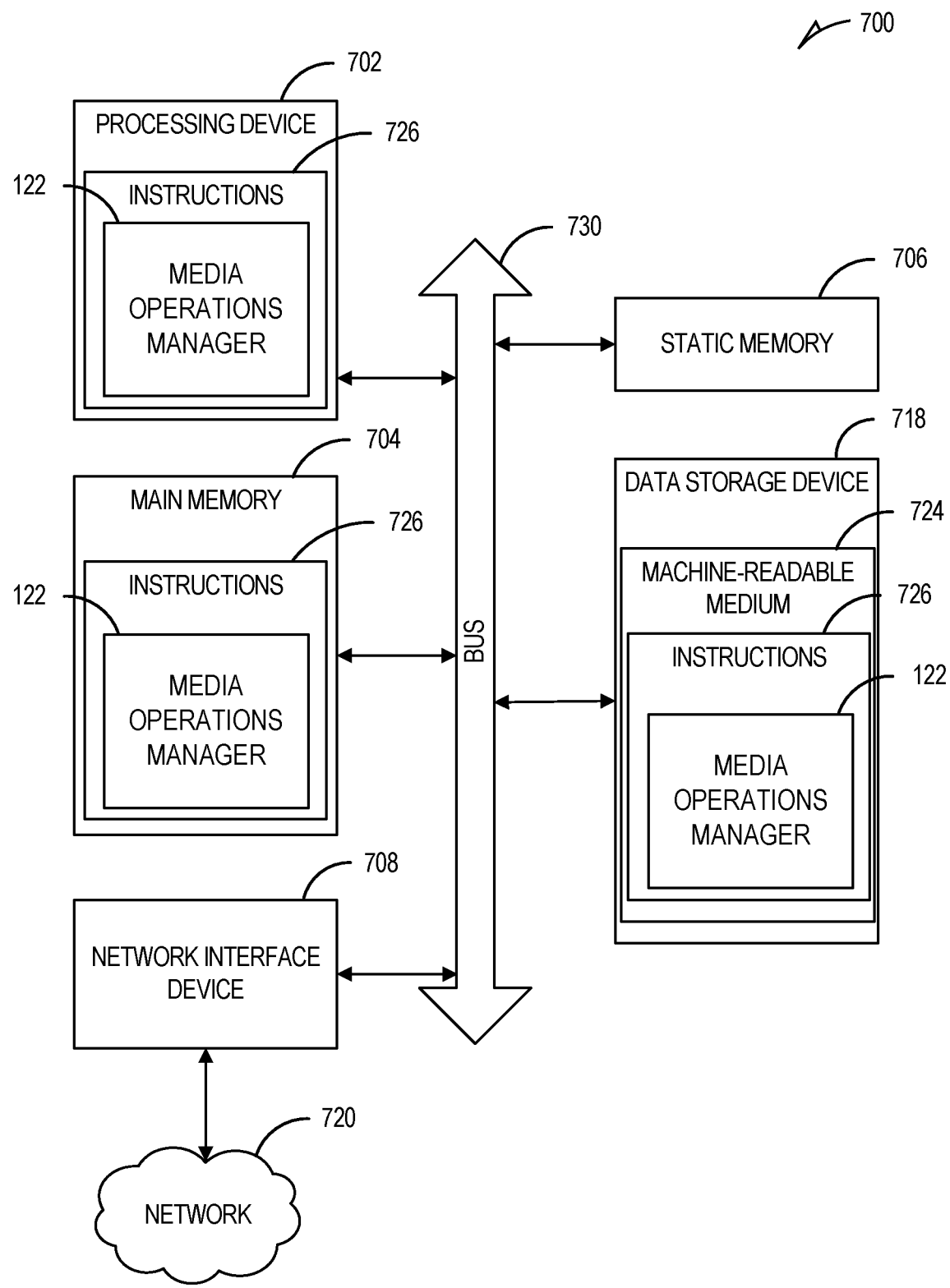
FIG. 7 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., ROM, flash memory, DRAM such as SDRAM or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an ASIC, a FPGA, a digital signal processor (DSP), a network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 implement functionality corresponding to the media operations manager 122 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; ROMs; RAMs; EPROMs; EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a set of memory components of a memory sub-system; and
    a processing device operatively coupled to the set of memory components, the processing device being configured to perform operations comprising:
        receiving a request to perform a folding operation on data stored in an individual block stripe of the set of memory components;
        retrieving, from a valid translational unit count (VTC) table, a plurality of VTC values corresponding to a plurality of portions of the individual block stripe;
        comparing a first VTC value of the plurality of VTC values associated with a first of the plurality of portions to a second VTC value of the plurality of VTC values associated with a second of the plurality of portions; and
        performing the folding operation on a subset of the plurality of portions based on a result of comparing the first VTC value to the second VTC value.

2. The system of claim 1, the operations comprising:
    generating a sequence for identifying invalid translational units (TUs) of the plurality of portions based on the plurality of VTC values.

3. The system of claim 2, the operations comprising:
    determining that the first VTC value fails to transgress a threshold value; and
    skipping performing the folding operation for the first portion of the individual block stripe associated with the first VTC value in response to determining that the first VTC value fails to transgress a threshold value.

4. The system of claim 2, the operations comprising:
    arranging the plurality of VTC values in descending order from a largest VTC value to a smallest VTC value, wherein the plurality of portions are arranged in the sequence according to the arranged descending order of the plurality of VTC values.

5. The system of claim 2, the operations comprising:
    arranging the plurality of VTC values in ascending order from a smallest VTC value to a largest VTC value, wherein the plurality of portions is arranged in the sequence according to the arranged ascending order of the plurality of VTC values.

6. The system of claim 1, wherein the first portion comprises a single first word line (WL) of the individual block stripe; and
    wherein the second portion comprises a single second WL of the individual block stripe.

7. The system of claim 1, wherein the first portion comprises a first set of translational units (TUs) of the individual block stripe; and
    wherein the second portion comprises a second set of TUs of the individual block stripe, the first set of TUs spanning across a plurality of dies and planes and a first set of word lines (WLs) of the set of memory components, the second set of TUs spanning across the plurality of dies and planes and a second set of WLs of the set of memory components.

8. The system of claim 7, wherein the first and second portions are of equal size.

9. The system of claim 1, wherein performing the folding operation comprises:

retrieving a physical to logical (P2L) entry associated with the subset of the plurality of portions;

extracting one or more intrinsic physical addresses for a corresponding set of translational units (TUs) associated with the P2L entry;

searching a logical to physical (L2P) table to obtain one or more current physical addresses corresponding to logical addresses of the set of TUs; and determining whether the one or more intrinsic physical addresses match the one or more current physical addresses.

10. The system of claim 9, wherein the P2L entry is stored in a page of the subset of the plurality of portions.

11. The system of claim 9, the operations comprising:

in response to determining that the one or more intrinsic physical addresses match the one or more current physical addresses:

rewriting data stored in the set of TUs to a new portion of the set of memory components; and erasing an old portion of the set of memory components in which the data was stored.

12. The system of claim 11, wherein the new portion corresponds to a new set of physical addresses; and wherein the old portion corresponds to the one or more current physical addresses.

13. The system of claim 1, wherein the first VTC value represents a quantity of valid translational units (TUs) in the first portion of the individual block stripe.

14. The system of claim 1, wherein the VTC table is stored external to the individual block stripe.

15. The system of claim 1, the operations comprising generating the VTC table by:

associating a portion of the VTC table with the individual block stripe;

storing a list of physical to logical (P2L) entry identifiers in the portion of the VTC table;

associating a first range of translational unit offsets with a first P2L entry and a second range of translational unit offsets with a second P2L entry; and maintaining a corresponding VTC value for each P2L entry identifier in the list of P2L entry identifiers including the first and second P2L entries.

16. The system of claim 15, wherein the first range of translational unit offsets is computed based on a die number, a plane number, a block number, and a page number of an individual portion of the individual block stripe corresponding to the first P2L entry.

17. The system of claim 1, wherein performing the folding operation comprises folding an individual word line of the individual block stripe without folding other word lines of the individual block stripe.

18. The system of claim 1, the operations comprising distributing a plurality of physical to logical (P2L) entries across multiple pages of the individual block stripe, a first of the P2L entries being separated from a second of the P2L entries by a quantity of translational units (TUs) represented by the second P2L entry.

19. A method comprising:

receiving a request to perform a folding operation on data stored in an individual block stripe of a set of memory components;

retrieving, from a valid translational unit count (VTC) table, a plurality of VTC values corresponding to a plurality of portions of the individual block stripe;

comparing a first VTC value of the plurality of VTC values associated with a first of the plurality of portions to a second VTC value of the plurality of VTC values associated with a second of the plurality of portions; and performing the folding operation on a subset of the plurality of portions based on a result of comparing the first VTC value to the second VTC value.

20. A non-transitory computer-readable storage medium comprising instructions that, when executed by a processing device, cause the processing device to perform operations comprising:

receiving a request to perform a folding operation on data stored in an individual block stripe of a set of memory components;

retrieving, from a valid translational unit count (VTC) table, a plurality of VTC values corresponding to a plurality of portions of the individual block stripe;

comparing a first VTC value of the plurality of VTC values associated with a first of the plurality of portions to a second VTC value of the plurality of VTC values associated with a second of the plurality of portions; and performing the folding operation on a subset of the plurality of portions based on a result of comparing the first VTC value to the second VTC value.

* * * * *